(12) United States Patent
Quinard et al.

(10) Patent No.: US 8,111,746 B2
(45) Date of Patent: *Feb. 7, 2012

(54) MOTION GRAPHICS KEYING IN THE COMPRESSED DOMAIN

(75) Inventors: Fabrice Quinard, Los Gatos, CA (US); Benjamin Philip Hollis, Mountain View, CA (US)

(73) Assignee: Motorola Mobility, Inc., Libertyville, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/912,961

(22) Filed: Oct. 27, 2010

(65) Prior Publication Data

US 2011/0038409 A1 Feb. 17, 2011

Related U.S. Application Data

(63) Continuation of application No. 11/387,750, filed on Mar. 22, 2006, now Pat. No. 7,839,927.

(60) Provisional application No. 60/665,301, filed on Mar. 24, 2005.

(51) Int. Cl.
H04N 11/02 (2006.01)

(52) U.S. Cl. .................................. 375/240.01

(58) Field of Classification Search .................. 375/240, 375/240.01, 240.25, 240.27; 719/700, 716, 719/719

See application file for complete search history.

(56) References Cited

U.S. PATENT DOCUMENTS

| 6,323,914 | B1 | 11/2001 | Linzer |
| 6,507,618 | B1 | 1/2003 | Wee et al. |
| 6,577,679 | B1 | 6/2003 | Apostolopoulos |
| 6,594,311 | B1 | 7/2003 | Pearlstein |
| 6,643,325 | B2 | 11/2003 | Webb et al. |
| 2002/0149617 | A1 | 10/2002 | Becker |
| 2003/0142129 | A1 | 7/2003 | Kleven et al. |

FOREIGN PATENT DOCUMENTS

| JP | 8265776 A | 10/1996 |
| JP | 08289297 A | 11/1996 |
| JP | 2000078468 | 3/2000 |
| JP | 2000078471 | 3/2000 |
| JP | 2000278643 A | 10/2000 |
| JP | 2002152051 A | 5/2002 |
| JP | 2002171530 A | 6/2002 |
| JP | 2003298934 A | 10/2003 |
| JP | 2004350030 A | 12/2004 |
| WO | 0031979 | 6/2000 |
| WO | 0119091 A2 | 3/2001 |

(Continued)

OTHER PUBLICATIONS

Leitch, "Digital Turnaround Processor", DTP-110/DTP-220, Installation and Operation Guide, Mar. 2005.

(Continued)

*Primary Examiner* — David C. Payne
*Assistant Examiner* — Vineeta Panwalkar

(57) ABSTRACT

Motion graphics keying in the compressed domain may be accomplished by receiving a compressed video stream comprising one or more source macroblocks, receiving a keyed graphics stream, determining which of the one or more source macroblocks overlaps with the keyed graphics stream, decoding only the one or more overlapping macroblocks to create one or more decoded macroblocks, combining the keyed graphics stream with the one or more decoded macroblocks to create a composited video stream, encoding the composited video stream to create an encoded composited video stream, and restoring the encoded composited video stream in the compressed video stream in place of the one or more overlapping macroblocks.

9 Claims, 6 Drawing Sheets

FOREIGN PATENT DOCUMENTS

| | | |
|---|---|---|
| WO | 0133861 A1 | 5/2001 |
| WO | 2006102614 A2 | 9/2006 |

OTHER PUBLICATIONS

ISO/IEC, International Standard, "information Technology-Generic Coding of Moving Pictures and Associate Audio Information: Video", Dec. 15, 2000.

Thales Broadcase & Multimedia, "Onyx Multimedia Router", downloaded from http://www.thales-bm.com/html_gb/frameset.html?name=products_mpg.html, Mar. 22, 2006.

SMPTE Standard, American National Standard, "Component Video Signal :2:2-Bit-Parallel Digital Interface", Jul. 16, 1992.

Chang S F et al.: "A new approach to decoding and compositing motion-compensated DCT-based images" 1993 IEEE International Conference on Acoustics, Speech, and Signal Processing, 1993, ICASSP-93; [Proceedings of the International Conference on Acoustics, Speech and Signal Processing (ICASSP)], Piscataway, NJ, USA, vol. 5, Apr. 27, 1993, pp. 421-424.

Supplementary European Search Report, European Patent Office, The Hague, Apr. 26, 2001, Bouffier, Alexandre, all pages.

Decision of Rejection, Japanese Patent Office, mailing date May 10, 2001, all pages.

MOTION GRAPHICS KEYING IN THE COMPRESSED DOMAIN

CROSS REFERENCE TO RELATED APPLICATIONS

The present application is a continuation of U.S. patent application Ser. No. 11/387,750, filed on Mar. 22, 2006, and claims priority from that application and from U.S. Provisional Patent Application 60/665,301, filed on Mar. 24, 2005, which are commonly owned and are incorporated herein by reference in their entireties.

FIELD OF THE INVENTION

The present invention relates to the field of computer science. More particularly, the present invention relates to a system and method for motion graphics keying in the compressed domain.

BACKGROUND OF THE INVENTION

Television graphics are typically produced using a technique known as keying, which allows graphics and text typically created by CG (Character Generator) systems, such as those marketed by Chyron Corporation of Melville, N.Y., to be composited with or overlaid on video programming. The CG systems typically output two signals: a "key" signal and a "fill" signal. The "key" defines the outlines of the image data that is overlaid on the video, and the "fill" defines the contents that are inserted into the keyed area. Keyers are devices that receive as inputs (1) the key, (2) fill streams, and (3) video in baseband format, combine the three inputs, and output the result as a single composite video stream. Keyers can typically perform this function either with analog video or with uncompressed digital video. Keyers that perform this function with uncompressed digital video typically utilize SDI (Serial Digital Interface) as a transport mechanism. SDI describes the ITU R BT 601 standard for interface of component digital video.

FIG. 1 is a block diagram that illustrates keying of baseband (uncompressed) video. As shown in FIG. 1, the source video stream 105 onto which graphics are keyed is uncompressed, as are the fill stream 124 and the key stream 130 output by the character generator 120. The composite video output 115 from the video mixer/keyer 110 remains uncompressed.

FIG. 2 is a block diagram that illustrates keying of MPEG video converted to baseband (uncompressed) video. In situations where the source video is in a compressed format, such as an MPEG (Motion Picture Experts Group) format, it has been necessary for an MPEG decoder 240 decode the MPEG source video stream 235 to baseband (uncompressed) video stream 205 before keying. A Video Mixer/Keyer 210 applies keying to the uncompressed video stream 205, which is then re-encoded by an MPEG encoder 245 back to an MPEG format, to continue to the next stage of the workflow. Because existing keyers can work only with baseband video, the need for decoding and re-encoding imposes problems such as increased equipment cost, latency due to additional processing time required, and degraded video quality caused by decoding and re-encoding using standard lossy video compression algorithms.

Accordingly, a need exists in the art for an improved solution that enables the real-time keying of digital motion graphics on top of compressed video streams.

SUMMARY OF THE INVENTION

Motion graphics keying in the compressed domain may be accomplished by receiving a compressed video stream comprising one or more source macroblocks, receiving a keyed graphics stream, determining which of the one or more source macroblocks overlaps with the keyed graphics stream, decoding only the one or more overlapping macroblocks to create one or more decoded macroblocks, combining the keyed graphics stream with the one or more decoded macroblocks to create a composited video stream, encoding the composited video stream to create an encoded composited video stream, and restoring the encoded composited video stream in the compressed video stream in place of the one or more overlapping macroblocks.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Figure 1:
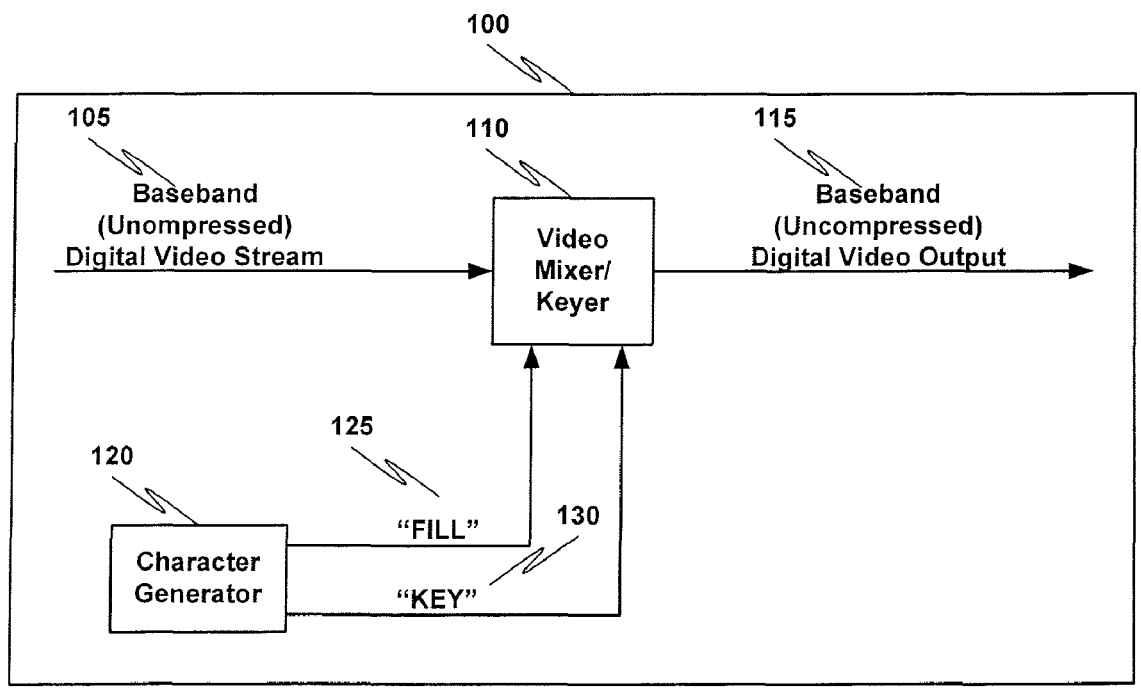
FIG. 1 is a block diagram that illustrates keying of baseband (uncompressed) video.
Figure 2:
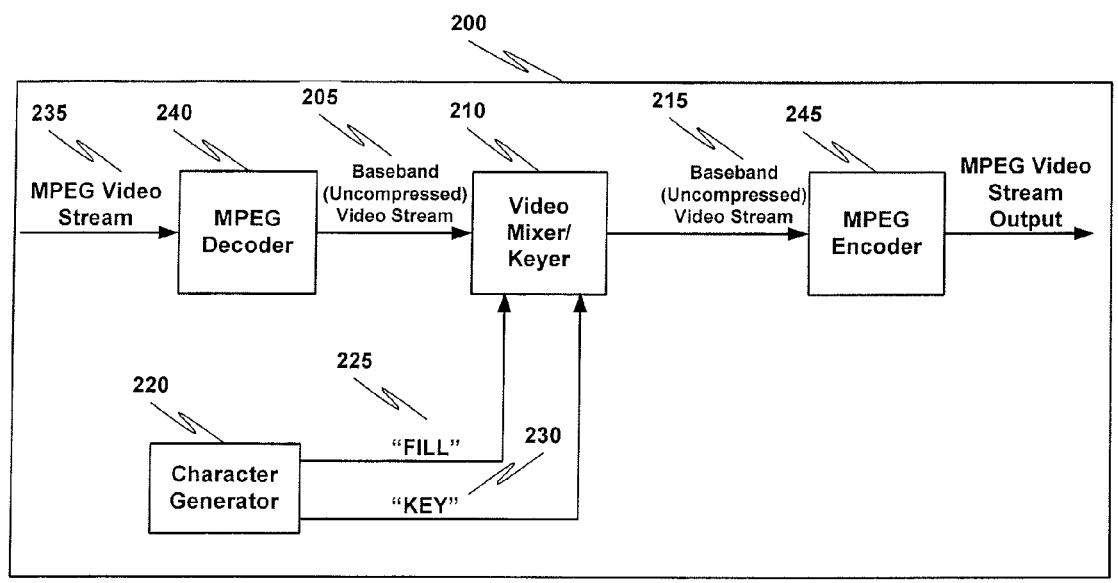
FIG. 2 is a block diagram that illustrates keying of MPEG video converted to baseband (uncompressed) video.

Embodiments of the present invention are described herein in the context of a system and method for motion graphics keying in the compressed domain. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with one embodiment of the present invention, the components, process steps, and/or data structures may be implemented using various types of operating systems (OS), computing platforms, firmware, computer programs, computer languages, and/or general-purpose machines. The method can be run as a programmed process running on processing circuitry. The processing circuitry can take the form of numerous combinations of processors and operating systems, or a stand-alone device. The process can be implemented as instructions executed by such hardware, hardware alone, or any combination thereof. The software may be stored on a program storage device readable by a machine.

In addition, those of ordinary skill in the art will recognize that devices of a less general purpose nature, such as hardwired devices, field programmable logic devices (FPLDs), comprising field programmable gate arrays (FPGAs) and complex programmable logic devices (CPLDs), application specific integrated circuits (ASICs), or the like, may also be used without departing from the scope and spirit of the inventive concepts disclosed herein.

In accordance with one embodiment of the present invention, the method may be implemented on a data processing computer such as a personal computer, workstation computer, mainframe computer, or high performance server running an OS such as Solaris® available from Sun Microsystems, Inc. of Santa Clara, Calif., Microsoft® Windows® XP and Windows® 2000, available from Microsoft Corporation of Redmond, Wash., or various versions of the Unix operating system such as Linux available from a number of vendors. The method may also be implemented on a mobile device running an OS such as Windows® CE, available from Microsoft Corporation of Redmond, Wash., Symbian OS™, available from Symbian Ltd of London, UK, Palm OS®, available from PalmSource, Inc. of Sunnyvale, Calif., and various embedded Linux operating systems. Embedded Linux operating systems are available from vendors including Monta Vista Software, Inc. of Sunnyvale, Calif., and FSMLabs, Inc. of Socorro, N. Mex. The method may also be implemented on a multiple-processor system, or in a computing environment comprising various peripherals such as input devices, output devices, displays, pointing devices, memories, storage devices, media interfaces for transferring data to and from the processor(s), and the like. In addition, such a computer system or computing environment may be networked locally, or over the Internet.

In the context of the present invention, the term "network" comprises local area networks, wide area networks, the Internet, cable television systems, telephone systems, wireless telecommunications systems, fiber optic networks, ATM networks, frame relay networks, satellite communications systems, and the like. Such networks are well known in the art and consequently are not further described here.

In the context of the present invention, the term "identifier" describes one or more numbers, characters, symbols, or the like. More generally, an "identifier" describes any entity that can be represented by one or more bits.

In the context of the present invention, the term "digital image" describes an image represented by one or more bits, regardless of whether the image was originally represented as an analog image.

Figure 3:
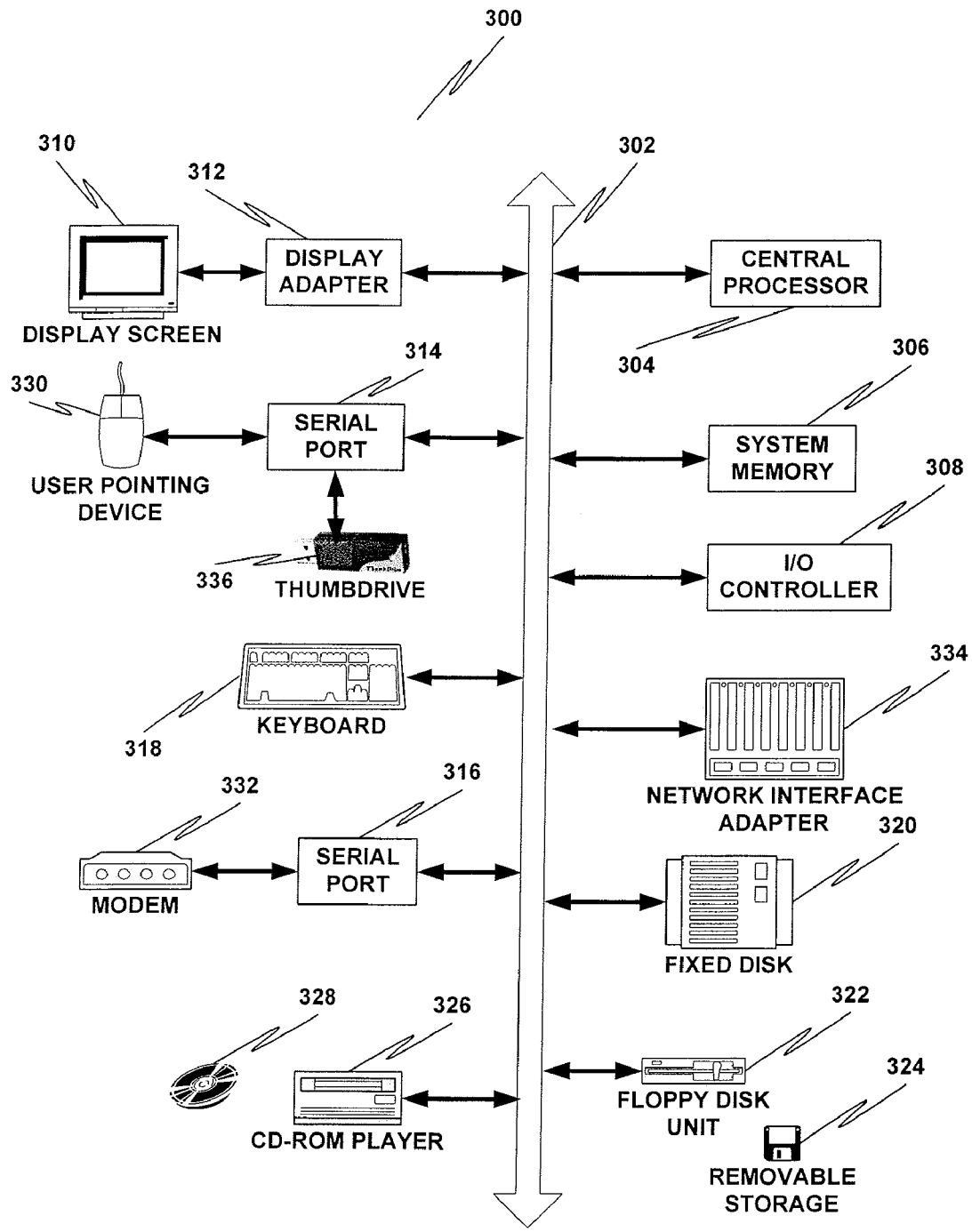
FIG. 3 is a block diagram of a computer system suitable for implementing aspects of the present invention.

FIG. 3 depicts a block diagram of a computer system 300 suitable for implementing aspects of the present invention. As shown in FIG. 3, computer system 300 comprises a bus 302 which interconnects major subsystems such as a central processor 304, a system memory 306 (typically RAM), an input/output (I/O) controller 308, an external device such as a display screen 310 via display adapter 312, serial ports 314 and 316, a keyboard 318, a fixed disk drive 320, a floppy disk drive 322 operative to receive a floppy disk 324, and a CD-ROM player 326 operative to receive a CD-ROM 328. Many other devices can be connected, such as a pointing device 330 (e.g., a mouse) connected via serial port 314 and a modem 332 connected via serial port 316. Modem 332 may provide a direct connection to a remote server via a telephone link or to the Internet via a POP (point of presence). Alternatively, a network interface adapter 334 may be used to interface to a local or wide area network using any wired or wireless network interface system known to those skilled in the art (e.g., Ethernet, xDSL, AppleTalk™, IEEE 802.11, and Bluetooth®).

Many other devices or subsystems (not shown) may be connected in a similar manner. Also, it is not necessary for all of the devices shown in FIG. 3 to be present to practice the present invention, as discussed below. Furthermore, the devices and subsystems may be interconnected in different ways from that shown in FIG. 3. The operation of a computer system such as that shown in FIG. 3 is readily known in the art and is not discussed in detail in this application, so as not to overcomplicate the present discussion. Code to implement the present invention may be operably disposed in system memory 306 or stored on storage media such as fixed disk 320, floppy disk 324, CD-ROM 328, or thumbdrive 336.

Embodiments of the present invention obviate the need to decode compressed video to baseband video in order to key the graphic stream coming from a CG system.

According to one embodiment of the present invention, a video mixer/keyer performs local decoding of only the macroblocks with which the keyed graphics overlap. The rest of the source video is left in its compressed state. The key and fill is applied to these decoded sections of the video image (i.e., the uncompressed keyed graphics stream is combined with the locally decoded sections of the video image), after which the composited video for the portions of the image that were temporarily decoded are re-encoded and restored within the full video stream. This is then distributed to the next stage of the workflow as encoded video, which retains its original high quality because most of the image is never decoded and re-encoded.

Figure 4:
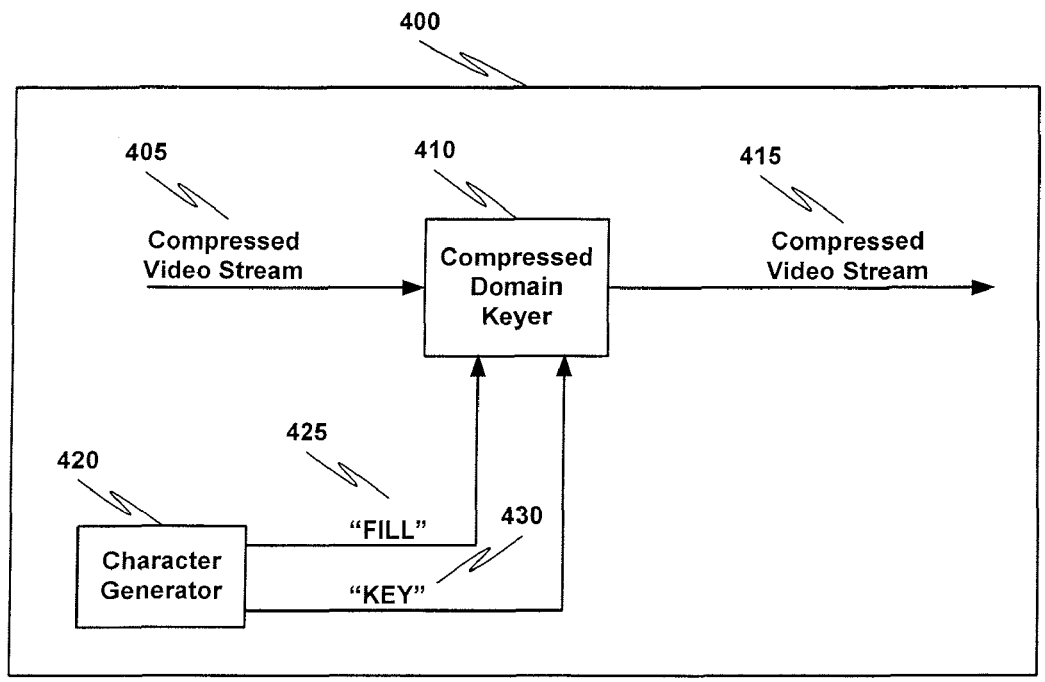
FIG. 4 is a block diagram that illustrates a system for motion graphics keying in accordance with one embodiment of the present invention.

Turning now to FIG. 4, a block diagram that illustrates a system for motion graphics keying in accordance with one embodiment of the present invention, is presented. As shown in FIG. 4, system 400 comprises a character generator 420 and a compressed domain keyer 410. Character generator is adapted to produce a keyed graphics stream comprising a fill stream 425 and a key stream 430. Compressed domain keyer 410 is adapted to receive, via an interface, the keyed graphics stream comprising fill stream 425 and key stream 430. Compressed domain keyer 420 is also adapted to receive, via an interface, a compressed video stream 405 comprising one or more source macroblocks. Compressed domain keyer 410 is further adapted to determine one or more overlapping macroblocks of the one or more source macroblocks. Overlapping macroblocks are source macroblocks that overlap with the keyed graphics stream. Compressed domain keyer 410 is further adapted to decode only the one or more overlapping macroblocks to create one or more decoded macroblocks. Compressed domain keyer 410 is further adapted to combine the keyed graphics stream with the one or more overlapping macroblocks to create a composited video stream. Compressed domain keyer 410 is further adapted to encode the composited video stream to create an encoded composited video stream. Compressed domain keyer 410 is further adapted to restore the encoded composited video stream in the compressed video stream 405 in place of the one or more overlapping macroblocks, to create a compressed video stream 415 including keyed digital motion graphics on top of compressed video stream 405.

Figure 5:
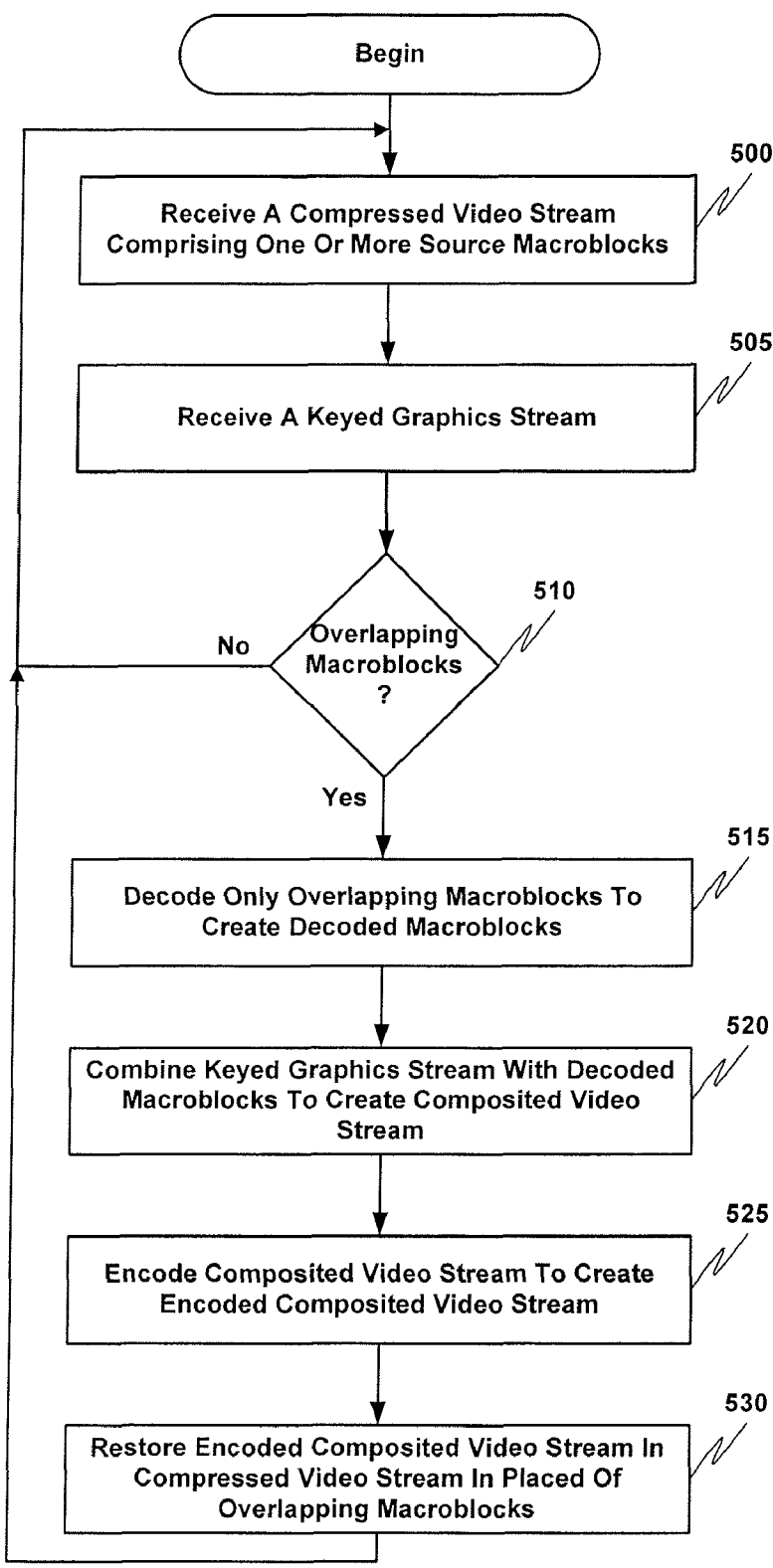
FIG. 5 is a flow diagram that illustrates a method for motion graphics keying in accordance with one embodiment of the present invention.

Turning now to FIG. 5, a flow diagram that illustrates a method for motion graphics keying in accordance with one embodiment of the present invention, is presented. FIG. 5 describes a process performed by the compressed domain keyer 410 of FIG. 4. The processes illustrated in FIG. 5 may be implemented in hardware, software, firmware, or a combination thereof. At 500, a compressed video stream comprising one or more macroblocks is received. At 505, a keyed graphics stream is received. The keyed graphics stream may comprise a fill stream and a key stream. At 510, a determination is made regarding whether one or more overlapping macroblocks exist. Overlapping macroblocks are source macroblocks that overlap with the keyed graphics stream. If one or more overlapping macroblocks are present, at 515, decoding of only the one or more overlapping macroblocks is performed, to create one or more decoded macroblocks. At 520, the keyed graphics stream is applied to the one or more overlapping macroblocks to create a composited video stream. At 525, the composited video stream is encoded to create an encoded composited video stream. At 530, the encoded composited video stream is restored in the compressed video stream in place of the one or more overlapping macroblocks, to create a compressed video stream including keyed digital motion graphics on top of a compressed video stream. Processing of the remaining video source and keyed graphics stream continues at 500.

The keyed graphics stream and the source video may be ingested in various ways in accordance with embodiments of the present invention. According to one embodiment of the present invention, the keyed graphics stream comprises uncompressed digital video delivered over an SDI transport.

Asynchronous Serial Interface (ASI) is a serial data transmission method for the MPEG-2 Standard that allows packet-based transmission of compressed video in DTV (Digital Television) transmission. According to one embodiment of the present invention, the MPEG source video is delivered over one or more ASI (Asynchronous Serial Interface) ports.

According to another embodiment of the present invention, the MPEG source video is delivered over one or more IP (Internet Protocol) ports. By way of example, the MPEG source video may be delivered over one or more gigabit Ethernet ports.

According to another embodiment of the present invention, compressed domain keyer 410 is adapted to listen continuously for keyed graphics streams (425, 430) and dynamically combine the keyed graphics streams (425, 430) with the compressed video stream 405 whenever keys are detected.

According to another embodiment of the present invention, audio embedded in the keyed graphics stream is extracted and multiplexed with the compressed video stream.

The compressed domain keyer 410 may comprise various architectures in accordance with embodiments of the present invention. In accordance with one embodiment of the present invention, the compressed domain keyer 410 leaves open the one or more ports listening for a video stream from the CG system 420. Any video the compressed domain keyer 410 receives is buffered as a sequence of image frames. Simultaneously, frames of the compressed video stream 405 passing through the compressed domain keyer 410 at that time are buffered (and re-ordered into chronological sequence, if necessary) and for each frame of the compressed video stream for which a keyed graphics stream frame co-exists in time, the key is applied by merging frames using the local decode/re-encode technique described above with respect to FIGS. 4 and 5.

Figure 6:
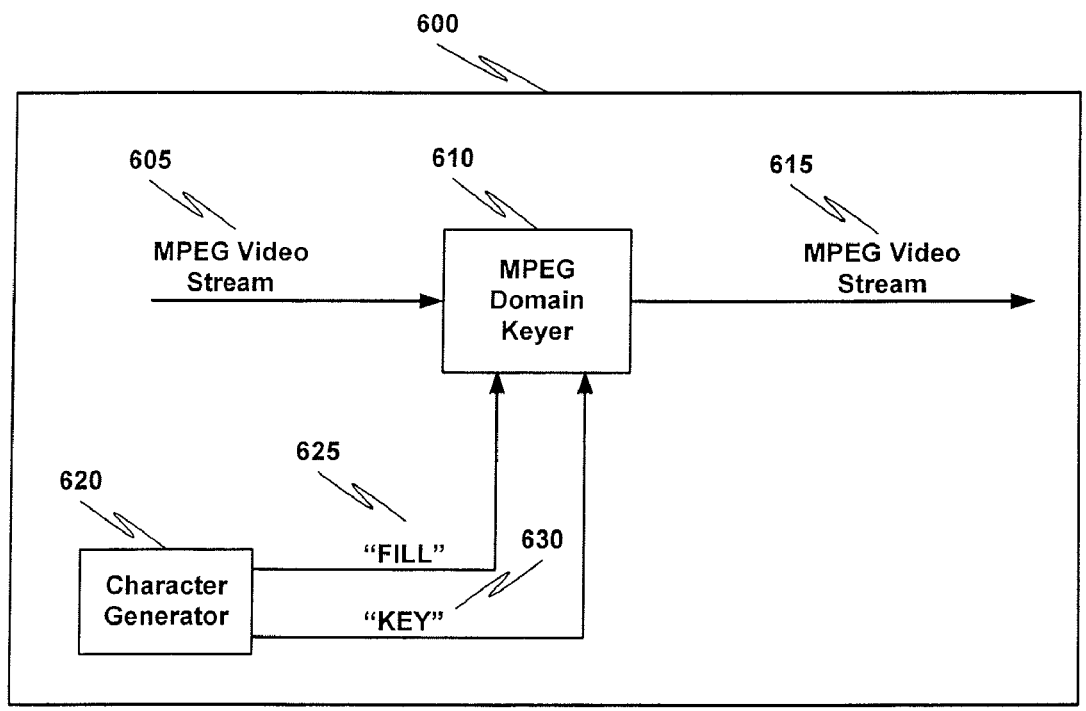
FIG. 6 is a block diagram that illustrates a system for MPEG motion graphics keying in accordance with one embodiment of the present invention.

FIG. 6 is a block diagram that illustrates a system for MPEG motion graphics keying in accordance with one embodiment of the present invention. FIG. 6 is similar to FIG. 4, and further indicates the compressed video stream is an MPEG video stream.

Embodiments of the present invention may realize one or more of the following: reduced equipment cost, reduced processing time, and increased video quality. Additionally, several types of motion graphics that can be generated by a CG system, including snipes and text crawls, can be composited in real time with the compressed video streams. Further, the use of a standard SDI interface and a keyer configured to passively listen to the CG system's outputs, thereby avoiding the need for a control signal or protocol, facilitates compatibility and interoperability with existing CG systems.

A program or programs may be provided having instructions adapted to cause a processing unit or a network of data processing units to realize elements of the above embodiments and to carry out the method of at least one of the above operations. Furthermore, a computer readable medium may be provided, in which a program is embodied, where the program is to make a computer execute the method of the above operation.

Also, a computer-readable medium may be provided having a program embodied thereon, where the program is to make a card device to execute functions or operations of the features and elements of the above described examples. A computer-readable medium can be a magnetic or optical or other tangible medium on which a program is recorded, but can also be a signal, e.g. analog or digital, electronic, magnetic or optical, in which the program is embodied for transmission. Furthermore, a data structure or a data stream may be provided comprising instructions to cause data processing means to carry out the above operations. The data stream or the data structure may constitute the computer-readable medium. Additionally, a computer program product may be provided comprising the computer-readable medium.

Although embodiments of the present invention have been illustrated with respect to motion graphics keying of digital video data, the invention may also be applied to digital audio or digital audio/video data.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for motion graphics keying in the compressed domain, the method comprising:
   receiving a compressed video stream comprising one or more source macroblocks;
   receiving a keyed graphics stream comprising uncompressed digital video;
   determining one or more overlapping macroblocks of said one or more source macroblocks that overlap with said keyed graphics stream;
   decoding only said one or more overlapping macroblocks to create one or more decoded macroblocks;

combining said keyed graphics stream with said one or more decoded macroblocks to create a composited video stream;

encoding said composited video stream to create an encoded composited video stream;

restoring said encoded composited video stream in said compressed video stream in place of said one or more overlapping macroblocks;

extracting audio embedded in said keyed graphics stream; and multiplexing said audio with the compressed video stream.

2. The method of claim 1 wherein said compressed video stream is delivered over one or more Asynchronous Serial Interface ports.

3. The method of claim 1 wherein said compressed video stream is delivered over one or more Internet Protocol (IP) ports.

4. The method of claim 3 wherein said one or more IP ports comprise one or more gigabit Ethernet ports.

5. The method of claim 1 further comprising:
listening continuously for said keyed graphics stream; and
dynamically combining said keyed graphics stream with said compressed video stream if one or more keys are detected.

6. The method of claim 1 further comprising:
leaving open one or more ports to listen for said keyed graphics stream;
simultaneously buffering a sequence of frames of video in said keyed graphics stream and a sequence of frames of said compressed video stream; and
for each frame of said compressed source video for which a keyed graphics frame co-exists in time, applying said key by merging the respective frames.

7. The method of claim 6 further comprising:
re-ordering said frames of said compressed video stream into a chronological sequence.

8. The method of claim 1 wherein said compressed video stream comprises an MPEG video stream.

9. The method of claim 1 wherein said keyed graphics stream comprises a key stream and a fill stream.

* * * * *